US010261746B2

(12) United States Patent
Masuike et al.

(10) Patent No.: US 10,261,746 B2
(45) Date of Patent: Apr. 16, 2019

(54) ELECTRONIC DEVICE (71) Applicant: KYOCERA Corporation, Kyoto (JP)

(72) Inventors: Isao Masuike, Machida (JP); Hideki Morita, Yokohama (JP); Yasushi Kitamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/709,659

(22) Filed: Sep. 20, 2017

(65) Prior Publication Data

US 2018/0081613 A1 Mar. 22, 2018

(30) Foreign Application Priority Data

Sep. 21, 2016 (JP) .................. 2016-184335

(51) Int. Cl.
*G06F 3/147* (2006.01)
*G06F 3/041* (2006.01)
*G06F 21/31* (2013.01)
*G06F 9/451* (2018.01)
*G09G 5/00* (2006.01)
*G06F 3/01* (2006.01)
*G09G 5/34* (2006.01)

(52) U.S. Cl.
CPC .............. *G06F 3/147* (2013.01); *G06F 3/041* (2013.01); *G06F 9/451* (2018.02); *G06F 21/31* (2013.01); *G09G 5/003* (2013.01); *G06F 3/017* (2013.01); *G06F 2203/04108* (2013.01); *G09G 5/346* (2013.01); *G09G 2330/022* (2013.01); *G09G 2354/00* (2013.01); *G09G 2358/00* (2013.01)

(58) Field of Classification Search
None
See application file for complete search history.

(56) References Cited

U.S. PATENT DOCUMENTS 9,031,533 B2 5/2015 Yajima et al.
2008/0305771 A1 12/2008 Yajima et al.
(Continued)

FOREIGN PATENT DOCUMENTS

JP 2007-013546 A 1/2007
JP 2008-306412 A 12/2008
(Continued)

OTHER PUBLICATIONS

An Office Action; "Notice of Reasons for Rejection," mailed by the Japanese Patent Office dated Jan. 17, 2017, which corresponds to Japanese Patent Application No. 2016-184335 and is related to the present application; with English language Concise Explanation.
(Continued)

*Primary Examiner* — Duane N Taylor, Jr.
(74) *Attorney, Agent, or Firm* — Studebaker & Brackett PC (57) ABSTRACT An electronic device includes a display and a controller that controls screen display of the display. When the mode immediately before suspension of screen display of the display is a first mode, the controller displays a security lock screen before resuming screen display of the display, and when the mode immediately before suspension of screen display of the display is a second mode, the controller resumes screen display of the display while selectively causing the security lock screen not to be displayed.

5 Claims, 6 Drawing Sheets (56) References Cited

U.S. PATENT DOCUMENTS

| | | | |
|---|---|---|---|
| 2011/0081889 A1* | 4/2011 | Gao | G06F 3/038 |
| | | | 455/411 |
| 2015/0346831 A1 | 12/2015 | Nii | |
| 2016/0048278 A1* | 2/2016 | Zhang | G06F 3/0484 |
| | | | 715/806 |

FOREIGN PATENT DOCUMENTS

| | | |
|---|---|---|
| JP | 2014-215673 A | 11/2014 |
| JP | 2015-225493 A | 12/2015 |

OTHER PUBLICATIONS

"No Lock: Change on/off of the lock screen! Android Application 1230", [online], Dec. 4, 2010, [searched on Jan. 4, 2017], <URL: http://octoba.net/archives/20101204-no-lock-android-1230.html>.

* cited by examiner

ELECTRONIC DEVICE

CROSS-REFERENCE TO RELATED APPLICATION

This application claims priority to and the benefit of Japanese Patent Application No. 2016-184335 filed Sep. 21, 2016, the entire contents of which are incorporated herein by reference.

TECHNICAL FIELD

This disclosure relates to an electronic device.

BACKGROUND

An electronic device that, for example, uses an infrared sensor to detect a gesture and then processes an input operation corresponding to the gesture has been proposed in recent years.

SUMMARY

An electronic device according to an embodiment of this disclosure includes a display configured to display a running screen and a security lock screen; and a controller configured to: cause the display to display the security lock screen if a mode immediately before suspension of displaying the running screen on the display is a first mode; and cause the display to resume displaying the running screen on the display without displaying the security lock screen on the display if a mode immediately before suspension of displaying the running screen on the display is a second mode.

An electronic device according to an embodiment of this disclosure includes a display configured to display a screen; a proximity sensor configured to detect a gesture of a user in the proximity thereof; and at least one processor configured to: set an operation mode to a mode; cause the display to suspend displaying the screen; and cause the display to resume displaying the screen if displaying the first screen is suspended in the mode and if the gesture is detected.

The electronic device according to one of the embodiments of this disclosure is more convenient.

DETAILED DESCRIPTION (Configuration of Electronic Device)

Figure 1:
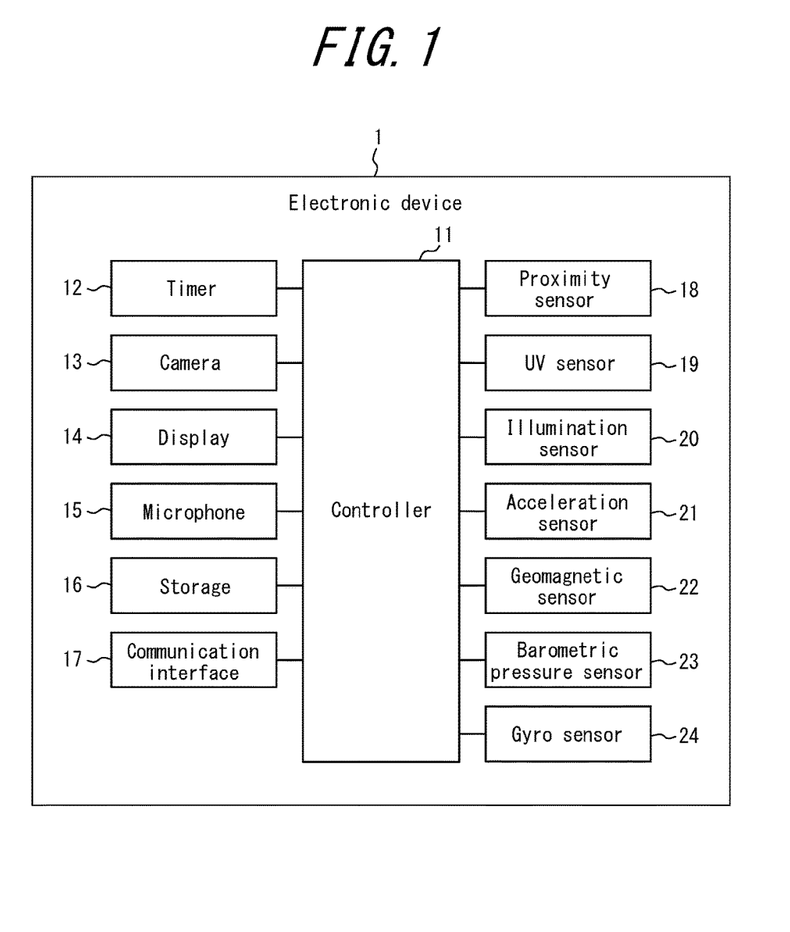
FIG. 1 is a configuration diagram of an electronic device according to one embodiment.

The electronic device 1 according to one embodiment illustrated in FIG. 1 includes a display 14, a storage 16, a communication interface 17, a proximity sensor 18 (gesture sensor), an acceleration sensor 21, and a controller 11. The electronic device 1 further includes a timer 12, a camera 13, a microphone 15, a UV sensor 19, an illumination sensor 20, a geomagnetic sensor 22, a barometric pressure sensor 23, and a gyro sensor 24. FIG. 1 is only an example, and the electronic device 1 need not include every component in FIG. 1. Also, the electronic device 1 may include components other than those illustrated in FIG. 1.

The display 14 displays a screen. The screen includes, for example, at least one of characters, images, symbols, graphics, and the like. The display 14 may be a liquid crystal display, an organic electro-luminescence panel, an inorganic electro-luminescence panel, or the like. In this embodiment, the display 14 is integrated with a touchscreen to constitute a touch panel. The touchscreen detects contact by a finger, a stylus, or other object and identifies the contact position. The touchscreen integrated with the display 14 can simultaneously detect a plurality of positions contacted by fingers, styluses, or other objects.

The storage 16 functions as a memory storing programs and data. The storage 16 temporarily stores the processing result of the controller 11. The storage 16 may include any storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. The applications for example cause the controller 11 to execute processing corresponding to a gesture. The control program may, for example, be an operating system (OS). The applications and control program may be installed on the storage 16 by communication with the communication interface 17 or from a storage medium.

The communication interface 17 is for communicating over a wired or wireless connection. The communication method of the communication interface 17 in one embodiment is prescribed by a wireless communication standard. For example, a cellular phone communication standard such as 2G, 3G, or 4G may be used as the wireless communication standard. Examples of cellular phone communication standards include long term evolution (LTE), wideband code division multiple access (W-CDMA), CDMA2000, personal digital cellular (PDC), global system for mobile communications (GSM® (GSM is a registered trademark in Japan, other countries, or both)), and personal handy-phone system (PHS). Examples of wireless communication standards include worldwide interoperability for microwave access (WiMAX), IEEE802.11, Bluetooth® (Bluetooth is a registered trademark in Japan, other countries, or both), infrared data association (IrDA), and near field communication (NFC). The communication interface 17 may support one or more of the aforementioned communication standards.

Without contact, the proximity sensor 18 detects the relative distance from an object near the electronic device 1 and the movement direction of the object. The proximity sensor 18 in one embodiment includes four visible light photodiodes that can detect white, red, green, and blue. The proximity sensor 18 can measure the relative distance from the object. The proximity sensor 18 also includes one infrared light emitting diode (LED) acting as a light source and four infrared photodiodes that detect the up, down, left, and right directions. An object is irradiated by infrared light from the infrared LED acting as a light source, and the proximity sensor 18 detects the movement direction of the object by the difference in time at which reflected light from the object is incident on each of the infrared photodiodes. Accordingly, the proximity sensor 18 can detect an air gesture (gesture) that the user of the electronic device 1 performs without touching the electronic device 1.

The acceleration sensor 21 detects the direction and magnitude of acceleration acting on the electronic device 1. The acceleration sensor 21 is a three-axis (3D) type of sensor that detects acceleration in the x-axis, y-axis, and z-axis directions. The acceleration sensor 21 may be of any type. The acceleration sensor 21 may, for example, be a piezoresistive type. Alternatively, the acceleration sensor 21 may be a capacitive type. The acceleration sensor 21 may also, for example, be a piezoelectric element (piezoelectric type) or thermal detection type of microelectromechanical system (MEMS). The acceleration sensor 21 may also, for example, be a servo-type of sensor that moves a moveable coil and returns the coil by feedback current. Furthermore, the acceleration sensor 21 may be a strain-gauge type of sensor that uses a strain gauge to measure strain generated by acceleration.

The controller 11 is a processor such as a central processing unit (CPU). The controller 11 may be a system-on-a-chip (SoC) or other type of integrated circuit in which other components are integrated. The controller 11 may be configured by combining a plurality of integrated circuits. The controller 11 implements a variety of functions by comprehensively controlling operations of the electronic device 1.

In greater detail, the controller 11 refers as necessary to data stored in the storage 16. The controller 11 implements a variety of functions by executing instructions included in programs stored in the storage 16 to control other functional components, such as the display 14.

As described below, the controller 11 controls whether to display the security lock screen before resuming screen display of the display 14.

The timer 12 receives an instruction for a timer operation from the controller 11. Once a predetermined time has elapsed, the timer 12 outputs a signal indicating that the time has elapsed to the controller 11. The timer 12 may be provided external to the controller 11, as illustrated in FIG. 1, or may be included within the controller 11.

The camera 13 captures images of subjects around the electronic device 1. One example of the camera 13 is a front camera provided on the same face as the display 14 of the electronic device 1.

The microphone 15 detects sounds around the electronic device 1, including people's voices.

The UV sensor 19 can measure the amount of ultraviolet light included in sunlight or other light.

The illumination sensor 20 detects the degree of illumination of surrounding light that is incident on the illumination sensor 20.

The geomagnetic sensor 22 detects the orientation of the earth's magnetism. For example, the component when the orientation of the electronic device 1 is projected onto a plane parallel to the ground is the orientation information acquired by the geomagnetic sensor 22. The orientation information acquired by the geomagnetic sensor 22 is the direction of the electronic device 1.

The barometric pressure sensor 23 detects the barometric pressure outside of the electronic device 1 (atmospheric pressure).

The gyro sensor 24 detects the angular velocity of the electronic device 1. The controller 11 can measure the orientation of the electronic device 1 by integrating the angular velocity, acquired by the gyro sensor 24, over time once.

(Operating the Electronic Device with a Gesture)

Figure 2:
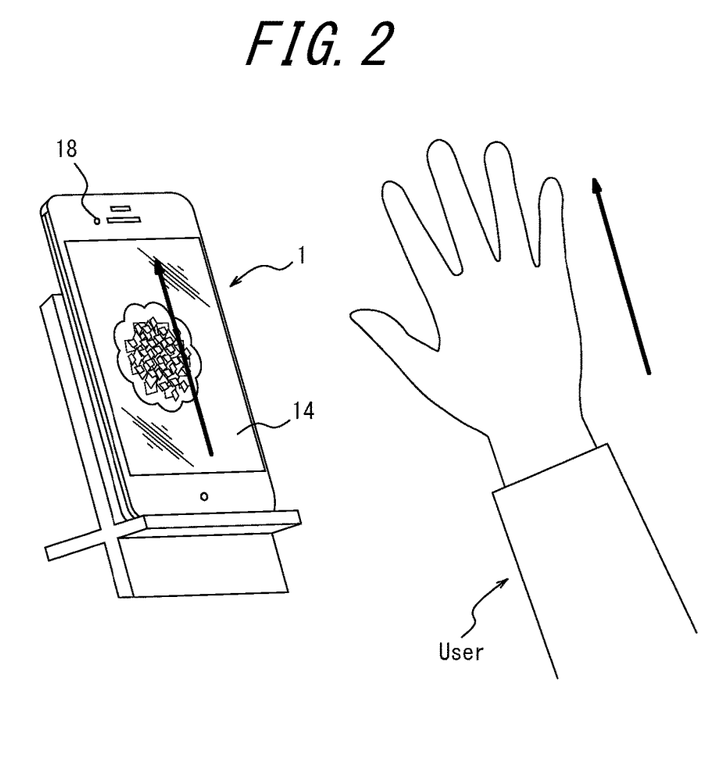
FIG. 2 illustrates the user operating an electronic device with a gesture.

FIG. 2 illustrates the user operating the electronic device 1 with a gesture. In the example in FIG. 2, the electronic device 1 is supported by a stand. Alternatively, the electronic device 1 may be leaned against a wall or placed on a table. Upon the proximity sensor 18 detecting a gesture by the user, the controller 11 executes processing in response to the gesture. Processing in response to a gesture may be processing such as scrolling the screen displayed on the display 14, zooming in or out on the screen displayed on the display 14, or the like. For example, in this embodiment, upon the user performing a gesture to raise the hand in the longitudinal direction of the display 14 (in the direction of the arrow in FIG. 2), the screen displayed on the display 14 is scrolled upward (in the direction of the arrow in FIG. 2).

The electronic device 1 in FIG. 2 is a smartphone. Alternatively, the electronic device 1 may, for example, be a mobile phone, a phablet, a tablet PC, a feature phone, or other such device. The electronic device 1 is not limited to these examples and may also be a personal digital assistant (PDA), a remote control, a portable music player, a game device, an electronic book reader, a car navigation device, a household appliance, an industrial device (factory automation (FA) device), or the like.

Figure 3:
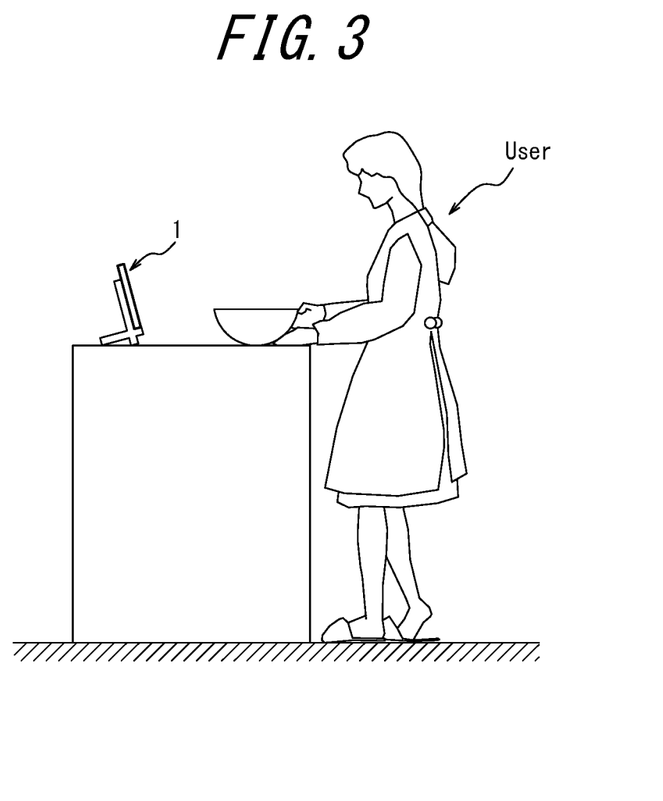
FIG. 3 illustrates an example of circumstances in which the user operates an electronic device with a gesture.

FIG. 3 illustrates an example of circumstances in which the user operates the electronic device 1 with a gesture. In the example in FIG. 3, the user is cooking in the kitchen by following a cooking recipe displayed on the display 14 of the electronic device 1. As mentioned above, the proximity sensor 18 detects a gesture by the user. The controller 11 executes processing in response to the gesture detected by the proximity sensor 18. The controller 11 can execute processing to scroll the recipe in response to a particular gesture (such as the user raising or lowering the hand). During cooking, the user's hand may get dirty or wet. Without touching the electronic device 1, however, the user can scroll the recipe with a particular gesture. The display 14 therefore does not get dirty, and dirt on the display 14 does not get on the user's hand during cooking.

(Security Lock Screen)

Figure 4A:
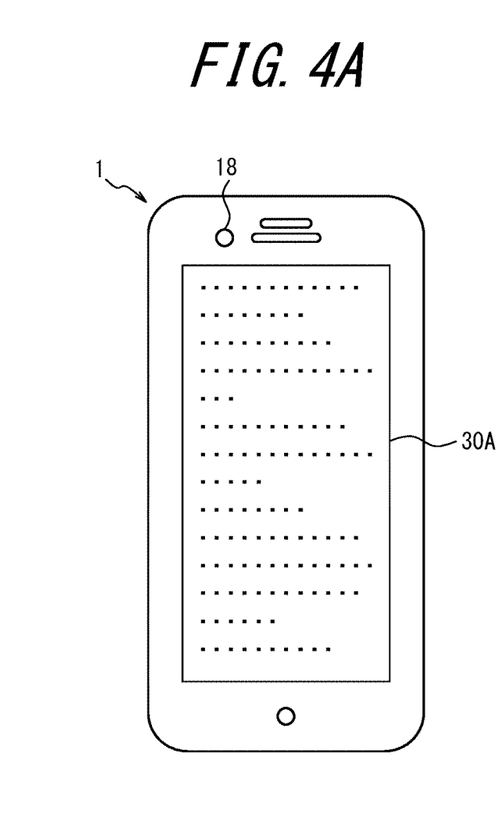
FIGS. 4A, 4B, and 4C respectively illustrate examples of a regular screen of the electronic device, a screen that is turned off, and a security lock screen.
Figure 4B:
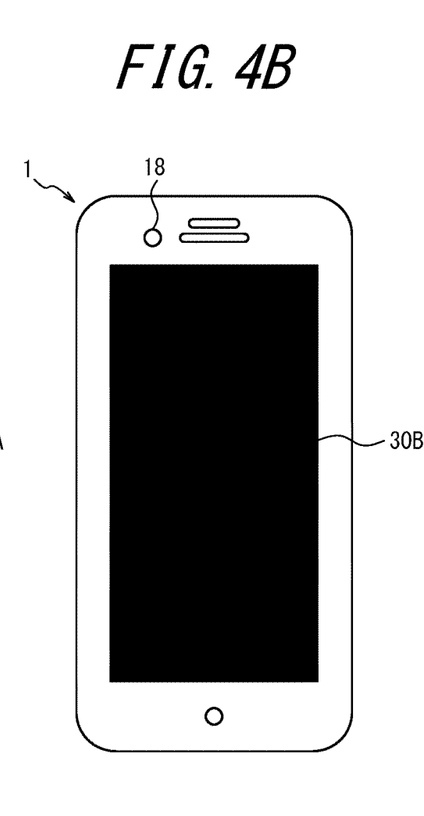
Figure 4C:
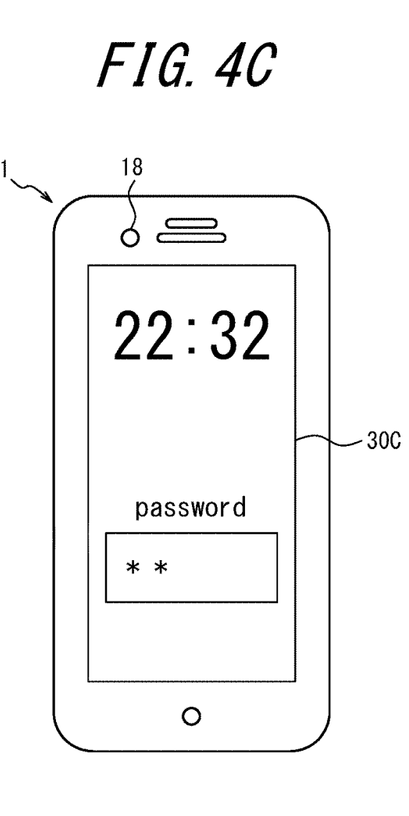

Here, FIG. 4A illustrates an example of the user using an application to cause the electronic device 1 to execute regular screen display. For example, in the example in FIG. 4A, the user launches a browser and causes a cooking recipe to be displayed as a screen 30A. When a state in which the user does not touch the touch panel continues, the electronic device 1, which is a smartphone, tablet, or the like, turns the screen off (suspends screen display) to reduce power consumption. FIG. 4B illustrates an example in which the electronic device 1 is turned off and is in a non-display state (screen 30B). This electronic device 1 also turns the screen off when the power button is pressed. For example, even if the user touches the power button on the electronic device 1 by mistake while cooking, the display 14 of the electronic device 1 changes to appear as illustrated in FIG. 4B. When returning from a state in which screen display is suspended, as illustrated in FIG. 4B, to regular screen display by an application, a security lock screen for inputting a PIN (password) is displayed for user verification. FIG. 4C illustrates an example of a security lock screen 30C. Upon the user inputting the correct password onto the security lock screen 30C, the electronic device 1 returns to the screen 30A previously displayed before turning off.

The electronic device 1 can execute processing in response to a gesture detected by the proximity sensor 18. Nevertheless, to ensure accuracy when inputting a password, contact needs to be made with the touch panel. If the security lock screen 30C is always displayed, however, the user needs to contact the touch panel even when the user's hand is dirty during cooking, for example. To increase usability, the electronic device 1 therefore executes the following processing, described with reference to FIGS. 5 and 6.

(Mode Setting)

The electronic device 1 has a plurality of modes. Modes refer to operation modes (operation states, operation statuses) that, for example, place restrictions on the operations of the entire electronic device 1. Only one mode can be selected at a time. In this embodiment, the electronic device 1 has a first mode and a second mode. The second mode is an operation mode (kitchen mode) of the electronic device 1 optimal for cooking in the kitchen while a recipe is displayed. By contrast, the first mode is a regular operation mode (regular mode) appropriate for use for example in rooms other than the kitchen or outside of the home. Details on the first mode and the second mode are provided below.

The electronic device 1 may also have other modes. The electronic device 1 may, for example, also have a low power mode and an airplane mode. The low power mode is a mode for operating the controller 11 at low speed to extend battery life. The airplane mode is a mode that suspends wireless communication by the communication interface 17. The electronic device 1 is described below as having only a first mode and a second mode.

Figure 5:
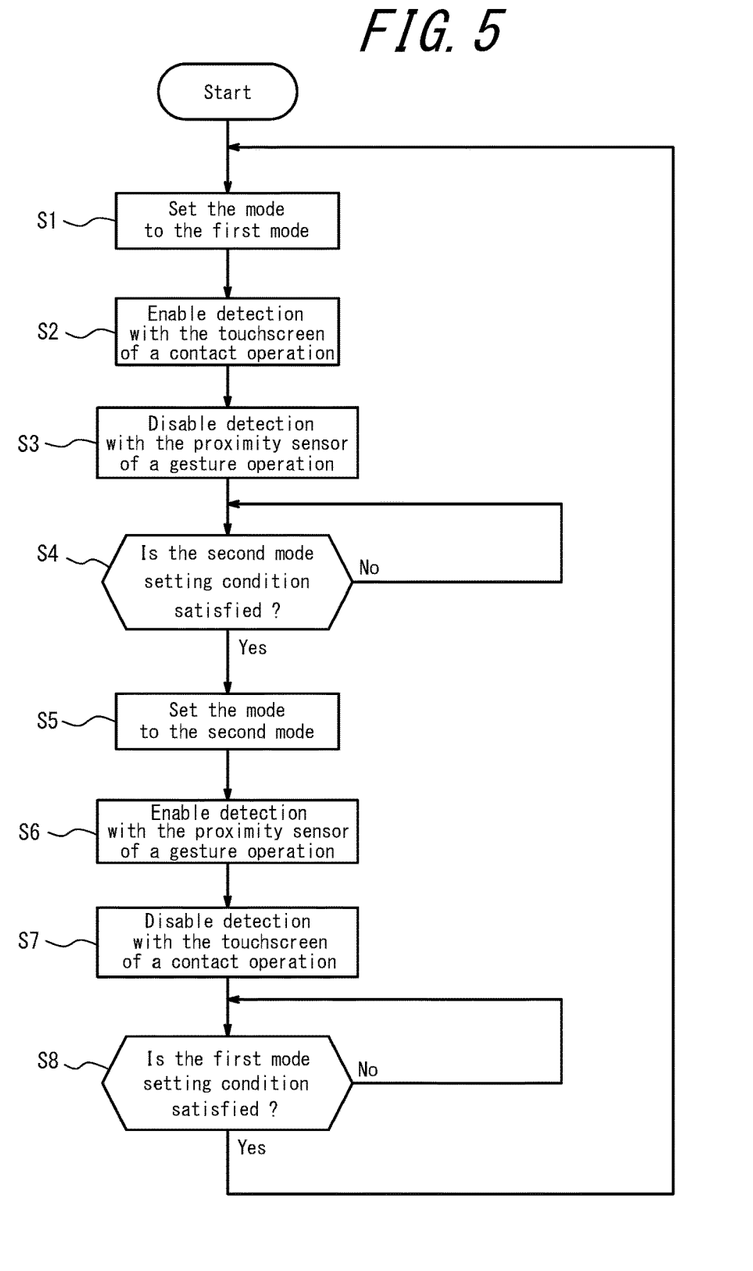
FIG. 5 is a flowchart illustrating an example of mode setting processing executed by an electronic device according to one embodiment.

FIG. 5 is a flowchart illustrating an example of mode setting processing executed by the electronic device 1. First, at the time of startup of the electronic device 1, the controller 11 sets the mode to the first mode (step S1). The first mode is a standard mode. For example, upon turning the power off while the electronic device 1 is operating in the second mode and then restarting, the controller 11 sets the mode to the first mode (by releasing the second mode).

The controller 11 enables detection with the touchscreen of a contact operation by the user (step S2). The controller 11 also disables detection with the proximity sensor 18 of a gesture operation by the user (step S3). With step S3, the controller 11 avoids competition between a gesture operation and a contact operation by the user (for example, preventing the proximity sensor 18 from detecting a contact operation by the user as a gesture operation). In other words, with steps S2 and S3, the controller 11 can detect a contact operation by the user on the touch panel more accurately.

The controller 11 stands by in the first mode until a second mode setting condition is satisfied (step S4: No). Upon the second mode setting condition being satisfied (step S4: Yes), the controller 11 sets the mode to the second mode (step S5). In this embodiment, the second mode setting condition is that the user sets the mode from the first mode (regular mode) to the second mode (kitchen mode) on a setting screen of the electronic device 1. Here, the second mode setting condition may include the user having launched a browser in the first mode and displayed a cooking recipe.

The controller 11 enables detection with the proximity sensor 18 of a gesture operation by the user (step S6). The controller 11 also disables detection with the touchscreen, which constitutes the touch panel and is integrally formed with the display 14, of a contact operation by the user (step S7). With step S7, the controller 11 avoids competition between a gesture operation and contact operation by the user. In other words, with steps S6 and S7, the controller 11 can detect a gesture operation by the user more accurately.

Figure 6:
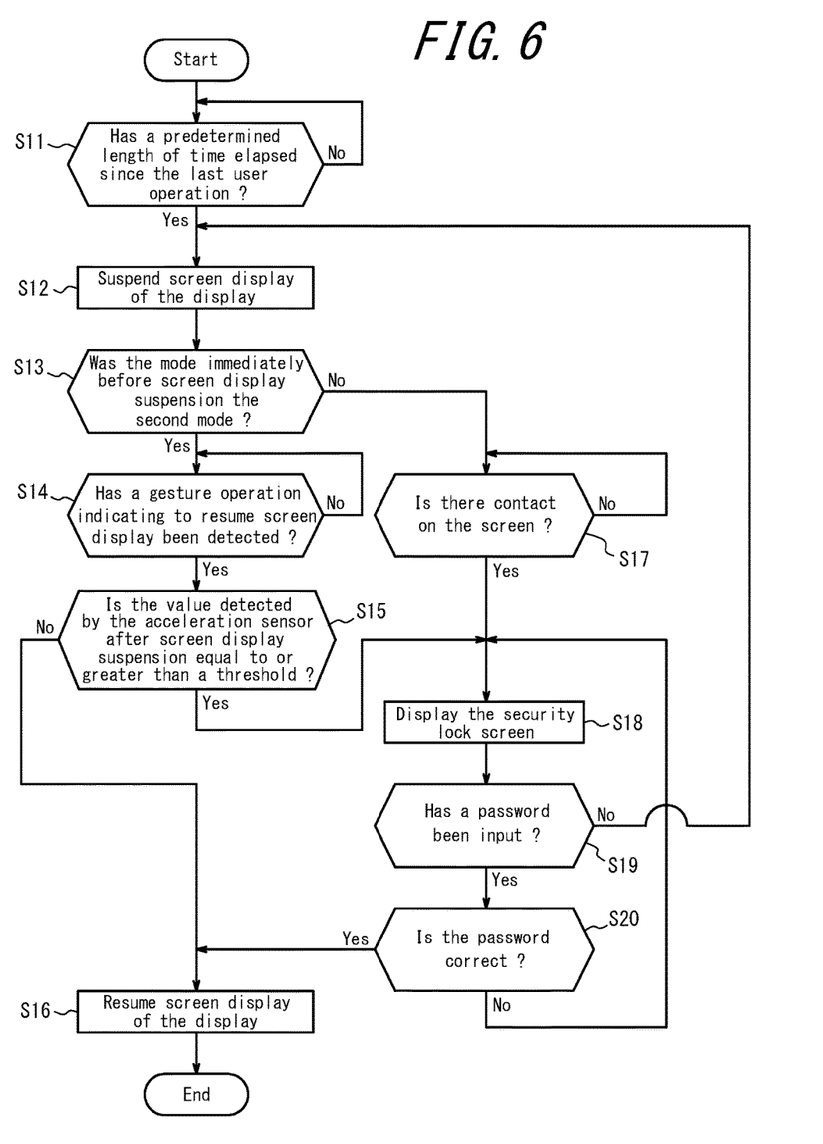
FIG. 6 is a flowchart illustrating an example of processing, executed by an electronic device according to one embodiment, to display the security lock screen in accordance with the mode.

The controller 11 stands by in the second mode until a first mode setting condition is satisfied (step S8: No). Upon the first mode setting condition being satisfied (step S8: Yes), the controller 11 returns to the processing in step S1 to set the mode to the first mode. In this embodiment, the first mode setting condition is that the user changes the mode from the second mode (kitchen mode) to the first mode (regular mode) on a setting screen of the electronic device 1. The first mode setting condition also preferably includes a determination by the controller 11 that the electronic device 1 has been carried out of the kitchen (i.e. that the below-described condition of step S15 in FIG. 6 is satisfied). Furthermore, the first mode setting condition may include the user having closed the browser that was displaying the cooking recipe in the second mode. The first mode setting condition may also include the user having caused something other than a cooking recipe to be displayed in the browser or having launched an application not related to the cooking recipe. Alternatively, the first mode setting condition may be that the user has opened the setting screen of the electronic device 1 (without having gone so far as changing the mode). The mode may also be settable from a notification (notification screen) that appears upon, for example, swiping the edge of the screen. When notifications can be used, the user can quickly and easily change modes without going through multiple layers of setting screens.

(Processing to Display the Security Lock Screen in Accordance with the Mode)

FIG. 6 is a flowchart illustrating an example of processing, executed by the electronic device 1, to display the security lock screen 30C in accordance with the mode. The controller 11 executes the below-described processing to display the security lock screen 30C along with the above-described mode setting processing.

The controller 11 stands by until a predetermined time has elapsed since the last user operation (step S11: No). Here, if the mode is the first mode, the last user operation is a recent contact operation by the user on the touchscreen, for example. If the mode is the second mode, the last user operation is a recent gesture operation by the user, for example. Upon a predetermined time elapsing after the last user operation (step S11: Yes), the controller 11 suspends the screen display of the display 14 (step S12). The predetermined time is, for example, 30 seconds. The predetermined time may be changeable by the user on a setting screen of the electronic device 1. When the screen display of the display 14 is suspended, the display 14 for example becomes a black screen, as illustrated in FIG. 4B.

The controller 11 determines whether the mode immediately before the screen display suspension was the second mode (step S13). When the mode immediately before screen display suspension was the second mode, i.e. the kitchen mode (step S13: Yes), then the controller 11 proceeds to the processing in step S14. Conversely, when the mode immediately before the screen display suspension was not the second mode, i.e. when the mode was the regular mode (step S13: No), then the controller 11 proceeds to the processing in step S17.

When the mode immediately before the screen display suspension is the kitchen mode (second mode), the controller 11 stands by until detecting a gesture operation by the user indicating to resume screen display (step S14: No). In other words, the controller 11 stands by until receiving data of a user's gesture operation detected by the proximity sensor 18 and determining that the gesture indicates to resume screen display. The gesture operation indicating to resume screen display may, for example, be a gesture to place the hand over the screen, a gesture to move the hand from one edge of the screen through to the opposite edge (for example, from the left edge to the right edge), or a gesture to trace a circle with a fingertip. Upon determining that a gesture operation by the user indicating to resume screen display has been detected (step S14: Yes), the controller 11 proceeds to the processing in step S15.

If a value detected by the acceleration sensor 21 after screen display suspension is not equal to or greater than a threshold (step S15: No), the controller 11 resumes the screen display of the display 14 and ends the processing sequence (step S16). If the value detected by the acceleration sensor 21 is less than the threshold, the controller 11 determines that the electronic device 1 has not been removed from the location (kitchen) where it was being used in kitchen mode, but rather is still in the kitchen with the user. Resuming screen display of the display 14 refers, for example, to the black screen 30B illustrated in FIG. 4B changing to display of the screen 30A of a cooking recipe illustrated in FIG. 4A. In other words, when the electronic device 1 has not been removed from the kitchen, and the mode immediately before suspension of screen display of the display 14 was the second mode (kitchen mode), then the controller 11 does not cause the security lock screen 30C to be displayed. Accordingly, the user in the kitchen does not need to perform a contact operation on the touch panel (input a password) in order to release the security lock screen 30C. The user can therefore resume display of the recipe screen and continue to cook with only a gesture.

On the other hand, if the value detected by the acceleration sensor 21 after screen display suspension is equal to or greater than a threshold (step S15: Yes), the controller 11 proceeds to the processing in step S18. Here, the processing in step S18 is processing to cause the security lock screen 30C to be displayed on the display 14. That is, if the value detected by the acceleration sensor 21 is equal to or greater than the threshold, the controller 11 determines that the electronic device 1 has been removed from the location (kitchen) where it was being used in kitchen mode. From a security standpoint, the controller 11 then displays the security lock screen 30C on the display 14. Even if the mode immediately before suspension of screen display of the display 14 was the second mode, the controller 11 displays the security lock screen 30C before resuming screen display of the display 14 if the value of acceleration subsequently detected by the acceleration sensor 21 is equal to or greater than the threshold. In other words, the controller 11 resumes screen display of the display 14 while selectively causing the security lock screen 30C not to be displayed. Performing this control secures the electronic device 1 even during operation in the kitchen mode. In this embodiment, the value of acceleration is the magnitude of the composite vector with components along the x, y, and z-axes, but a two-axis composite vector (for example, the x and y-axes) may be used, or at least one of the components along the x, y, and z-axes may be used.

When the mode immediately before the screen display suspension is not the kitchen mode (second mode), the controller 11 stands by until detecting contact on the screen (step S17: No). In other words, the controller 11 stands by until a contact operation by the user is detected with the touchscreen that constitutes the touch panel and is integrally formed with the display 14. At this time, the black screen 30B remains on the display 14 (see FIG. 4B). When the display 14 is contacted (step S17: Yes), the controller 11 proceeds to the processing in step S18.

Upon causing the security lock screen 30C to be displayed on the display 14 (step S18), the controller 11 executes the following related processing. First, the controller 11 determines whether a password has been input onto the touchscreen (step S19). Upon determining that a password has been input (step S19: Yes), the controller 11 proceeds to the processing in step S20. When determining that a password has not been input (step S19: No), the controller 11 returns to the processing in step S12.

When determining that a password has been input, the controller 11 determines whether the password is correct (step S20). If the password is correct (step S20: Yes), the controller 11 resumes screen display of the display 14 and terminates the sequence of processing (step S16). Conversely, if the password is incorrect (step S20: No), the controller 11 returns to the processing in step S18.

As described above, when the mode immediately before suspension of screen display of the display 14 was the first mode (regular mode), the controller 11 causes the security lock screen 30C to be displayed before resuming screen display of the display 14. On the other hand, when the mode immediately before suspension of screen display of the display 14 was the second mode (kitchen mode), the controller 11 selectively causes the security lock screen 30C not to be displayed (for example, when determining that the electronic device 1 has not been removed from the kitchen). As a result, by operating the electronic device 1 in the second mode (kitchen mode), a user who is cooking in the kitchen and has dirty or wet hands can resume screen display without touching the touch panel. The electronic device 1 can thus be made more convenient.

In this embodiment, when the mode of the electronic device 1 is the second mode (kitchen mode), the controller 11 enables detection with the proximity sensor 18 of a gesture operation by the user. As a result, by operating the electronic device 1 in the second mode (kitchen mode), a user who is cooking in the kitchen and has dirty or wet hands can easily resume screen display, for example with a gesture to place a hand over the screen. Therefore, the electronic device 1 is made even more convenient for use in the kitchen, where the screen display tends to be suspended because of the time required to perform each cooking step.

In this embodiment, when the mode of the electronic device 1 is the second mode (kitchen mode), the controller 11 disables detection with the touchscreen of a contact operation by the user. At this time, competition between a gesture operation and contact operation by the user is avoided. In other words, the controller 11 can detect a gesture operation by the user more accurately. Furthermore, when the mode of the electronic device 1 is the second mode (kitchen mode), the security lock screen 30C is not displayed if the electronic device 1 has not been removed from the kitchen. Therefore, disabling detection with the touchscreen of a contact operation by the user poses no operational problems (such as a problem of not being able to input a password).

In this embodiment, even if the mode immediately before suspension of screen display of the display 14 was the second mode (kitchen mode), the controller 11 displays the security lock screen 30C before resuming screen display of the display 14 if the value of acceleration detected by the acceleration sensor 21 is equal to or greater than the threshold. That is, if the value detected by the acceleration sensor 21 is equal to or greater than the threshold, the controller 11 determines that the electronic device 1 has been removed from the location (such as the kitchen) where it was being used in kitchen mode. From a security standpoint, the controller 11 then displays the security lock screen 30C on the display 14. As a result, the electronic device 1 can be secured even during operation in the kitchen mode.

(Other Embodiments)

This disclosure is based on the drawings and on embodiments, but it should be noted that a person of ordinary skill in the art could easily make a variety of modifications and adjustments based on this disclosure. Therefore, such changes and modifications are to be understood as included within the scope of this disclosure. For example, the functions and the like included in the various components and steps may be reordered in any logically consistent way. Furthermore, components or steps may be combined into one or divided.

In the above embodiment, the controller 11 determines that the electronic device 1 has been removed from the kitchen by the value of the acceleration detected by the acceleration sensor 21 being equal to or greater than a threshold. Alternatively, the controller 11 may acquire a GPS signal through the communication interface 17 and set a condition for removal from the kitchen to be that the calculated displacement of the electronic device 1 is equal to or greater than a threshold. The controller 11 may also refer to map data and set the condition to be that the position of the electronic device 1 is not within a predetermined area (the kitchen) on the map. As well as the value of the acceleration sensor 21, the controller 11 may also acquire the detected value and the measured value from the gyro sensor 24 and the timer 12. The controller 11 may then acquire the inclination of the electronic device 1 from the detected value (angular velocity) of the gyro sensor 24. The controller 11 may also acquire the time from the timer 12. The controller 11 may then determine that the electronic device 1 has been removed from the kitchen when at least one of the following holds: the inclination of the electronic device 1 has changed significantly, the value of the acceleration is equal to or greater than a threshold, and these changes have occurred for a predetermined length of time or greater. At this time, the accuracy of the determination by the controller 11 increases by using information other than information from the acceleration sensor 21.

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, a radio-frequency identification (RFID) receiver, a game device, an electronic notepad, a laptop computer, a global positioning system (GPS) receiver, and other programmable data processing apparatuses. It should be noted that in each embodiment, various operations are executed by a dedicated circuit (for example, individual logical gates interconnected in order to execute a particular function) implementing program instructions (software), or by a logical block, program module, or the like executed by one or more processors. The one or more processors that execute a logical block, program module, or the like include, for example, one or more of a microprocessor, CPU, application specific integrated circuit (ASIC), digital signal processor (DSP), programmable logic device (PLD), field programmable gate array (FPGA), processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 16 used here may also be configured as a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a compact disc (CD), laser disc®, digital versatile disc (DVD®), floppy® disk, and Blu-ray disc® (laser disc, DVD, floppy, and Blu-ray disc are registered trademarks in Japan, other countries, or both). Further examples include a portable computer disk, random access memory (RAM), read-only memory (ROM), rewritable programmable ROM such as erasable programmable read-only memory (EPROM), electrically erasable programmable read-only memory (EEPROM), or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. In other words, the "memory" is not limited to a particular type or number. The type of medium on which information is stored is not limited, either.

The invention claimed is:

1. An electronic device comprising:
    a display configured to display a running screen and a security lock screen; and
    a controller configured to, upon resuming display of the running screen on the display after a suspension of displaying the running screen:
        determine whether the electronic device was operating in a regular mode or a gesture mode immediately before the suspension of displaying the running screen on the display; and
        in a case that the electronic device was operating in the regular mode immediately before the suspension of displaying the running screen on the display, cause the display to display the security lock screen before resuming display of the running screen on the display; and
        in a case that the electronic device was operating in the gesture mode immediately before the suspension of displaying the running screen on the display, cause the display to resume displaying the running screen on the display without first displaying the security lock screen on the display, wherein the regular mode is a mode for operating the electronic device by touching the electronic device, and the gesture mode is a mode for operating the electronic device without touching the electronic device.

2. The electronic device of claim 1, further comprising: a proximity sensor, wherein the controller enables detection with the proximity sensor of a gesture operated by a user during the gesture mode.

3. The electronic device of claim 2, further comprising: a touch screen configured to receive a touch input from a user, wherein the controller is further configured to cause the touch screen not to detect the touch input during the gesture mode.

4. The electronic device of claim 1, further comprising: an acceleration sensor configured to measure a value of acceleration, wherein if the mode immediately before suspension of displaying the running screen on the display is the gesture mode, the controller is further configured to cause the display to display the security lock screen if the value is equal to or greater than a threshold.

5. An electronic device comprising:

a display configured to display a screen;

a proximity sensor configured to detect a gesture of a user in the proximity thereof; and at least one processor configured to:

set an operation mode to at least one of a gesture mode for operating the electronic device without touching the electronic device, and a regular mode for operating the electronic device by touching the electronic device;

cause the display to suspend displaying the screen; and cause the display to resume displaying the screen without first displaying a security lock screen on the display, if displaying the screen is suspended in the gesture mode and the gesture is detected; and cause the display to display a security lock screen on the display before resuming display of the screen, if displaying the screen is suspended in the regular mode and a touch input is detected.

* * * * *